3,146,074
MULTIPLE BED REACTOR
Herbert Drechsel and Hugo Grimm, both of Frankfurt am Main, Germany, assignors to Metallgesellschaft A.G., Frankfurt am Main, Germany, a corporation of Germany
Filed Sept. 6, 1961, Ser. No. 136,305
Claims priority, application Germany Sept. 8, 1960
6 Claims. (Cl. 23—288)

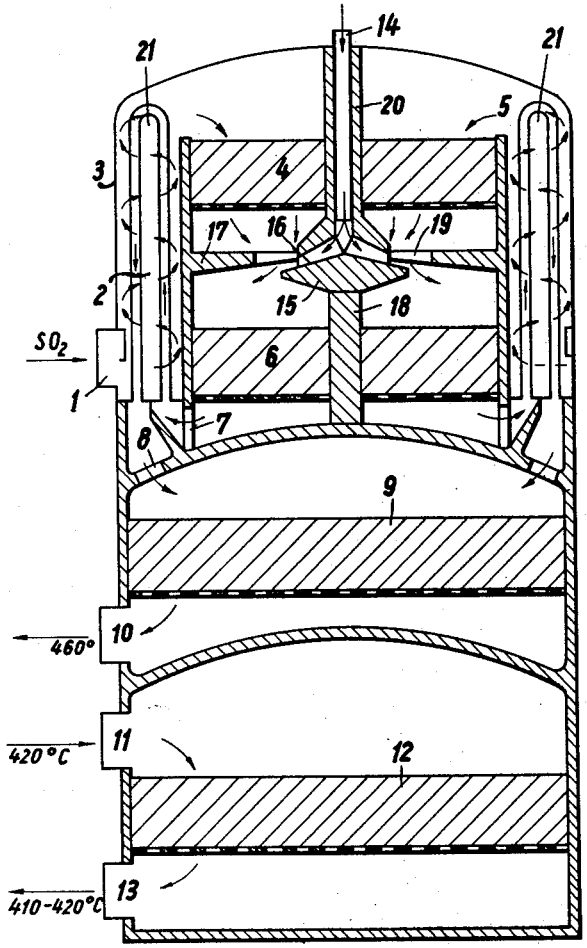

This invention relates to multiple bed reactors and particularly to reactors for oxidation of $SO_2$ containing gases to $SO_3$ employing catalysts usually vanadium catalysts.

In operating this type of apparatus it is necessary to keep the operating temperatures within comparatively narrow limits. Such limits depend partly upon the degree of concentration of the $SO_2$ and partly upon the type of catalysts used. Such limits are usually between 420° and 450° C. While the initial temperature of the gas passing through the first catalyst bed may be between these limits at the last bed of a series, the temperature should be down near the low limit because the equilibrium is shifted to the undesirable side of the $SO_3$ dissociation when the temperature is higher. Usually the first bed can operate at a somewhat higher temperature than the minimum to produce rapid reaction.

As the gas passes through the reactors the temperature rises so that it has to be lowered to keep within the prescribed limits. Various devices have been used for this purpose and in some cases the heat is used regeneratively to heat the incoming gas to a suitable initial temperature.

In the operation of this type of apparatus there are often long periods of interruption of the operation during which the entire apparatus is apt to cool off, leading to difficulties of restarting the apparatus. Another difficulty in previous heat exchangers used is that the heat transfer values only lie in the order of magnitude of ten to fourteen kcal./$m^2$ per hour per degree centigrade at a pressure loss of twenty to thirty mm. water column on the $SO_2$ side and of forty to sixty mm. water column on the $SO_3$ side.

An object of the present invention is to improve the multiple bed reactor construction to obtain with less material and space a better heat transfer and accompanied by a better temperature control than previously.

Another object of the invention is to improve the life of the material of the construction and provide a high heat stability during periods of operation which permits greater periods of interruption of operation without preparatory heating up on resuming operation.

Further objects and the advantages thereof of the construction will be in part obvious and in part pointed out hereinafter.

In the drawing:
FIG. 1 is a vertical section through a reactor constructed in accordance with the practice of the invention, and
FIG. 2 is a detail of the end of the pipe for introducing cold gas between the first and second stages of the reactor.

Referring to the drawing, the reactor is provided with an enclosing outer wall 3 within which are arranged a series of contact catalyst reactor beds 4, 6, 9 and 12. The first reactor bed 4 and the second bed 6 are contained within a circular shell having a separating horizontal wall or roof 17 having a central aperture 19 to permit passage of $SO_2$ laden gas from reactor 4 to reactor 6. In passing through reactor beds 4 and 6 the temperature rises as the catalytic action of beds oxidizes the $SO_2$ to $SO_3$.

To reach first reactor bed 4, gas laden $SO_2$ partially heated by any suitable preheater (not shown) is introduced in an annular passage 1 from which it emerges into an annular space 2 between the outer shell 3 and the chamber enclosing first and second stage reactor beds 4 and 6. From this annular passage 2, gas passes to the upper space 5 in the head of the outer shell 3.

For suitably heating the gas preparatory to entering the catalyst layer 4 a heat exchanger 21 is arranged in the annular space 2, which is a continuous nest of U-shaped tubes surrounding the outer wall of the chamber enclosing beds 4 and 6. One end of each tube of heat exchanger 21 is supplied with the hot gas leaving bed 6 by way of an outlet 7, and the discharge end of the tubes of heat exchanger 21 is in communication with the outlet passage 8 leading to the third stage catalyst bed 9 situated below second stage bed 6 and within shell 3.

The U-tubes of heat exchanger 21, as will be seen in the drawing, carry gas upwardly and then downwardly toward the exit communicating with passage 8. Thus, gas passing from the ring passage 1 into the annular space 2 is caused to pass across the tubes and upwardly toward the space 5. In so doing the gas passes, with respect to the path of gas within the tubes, in a flow in the direction of such heating gas and partly counterflow.

Preferably, in such passage, the entering gas is at an initial temperature of 440° C. which is suitable for the reaction taking place within the bed 4.

Cooling down of the gas leaving bed 4 is effected by a feature of invention which includes a centrally-positioned tube 20 extending to the exterior of housing 3 and terminating in a plurality of radially directed passages 16 adjacent a mushrooom head 15 which may be formed integrally with pipe 20 and terminate in a stem 18 supported from below. The central aperture 19 in roof 17 surrounds pipe 20 at the apertures 16 so that gas will thoroughly mix with the gas issuing from the passages 16. The pipe 20 and its mushroom portion 15 may be composed of a ceramic material and for strength it may be lined with a suitable metallic pipe 14 for communication to the exterior.

As, in each case, contact with the catalysts raises the temperature of the gas, in passing through catalyst bed 9, the temperature will rise as for instance to 460° which is too hot for introduction to the last catalyst bed 12 and therefore a suitable exit 10 is provided for such gas for cooling by a suitable intercooler (not shown) the heat of which may be used for initially warming the gas being introduced at passage 1. When thus cooled to a suitable temperature of 420° C., for instance, the gas is returned at the opening 11 to the last stage catalyst bed 12 from which it issues and it is withdrawn completely converted at the exit 13.

As has been said above, this construction is adapted to remain hot for long periods of operation interruption and this is possible on account of the insulating effect of the heat exchanger 21 which surrounds and protects the chamber enclosing catalyst beds 4 and 6.

Furthermore, the heat transfer coefficient of the heat exchanger 21 is excellent because of the undulatory current flow on the pipe area. Due to the high velocity flow of the gas being heated, the pipe wall temperature is kept relatively low which permits the use of steel pipes in heat exchanger 21, which would be unsafe in heat exchangers using a simple hot air counter-current flow of gases within and outside of the pipe.

Because of the omission of so-called hot $SO_2$ and $SO_3$ gas connection pipe line from the reactor to outside heat exchangers and back, the expense of pipe lines and insulating material, and accompanying heat losses are avoided.

As has been said above, long periods of interruption are possible with this apparatus. It has been found possible to resume operations with this apparatus after an interruption of forty hours or longer without initial reheating to get started, while previous apparatus of this general character have not been so usable after a longer interruption of operation than from ten to twenty hours. As has been said above, this long interruption is possible through the excellent insulating effect of gas stagnating in the heat exchanger in its annular arrangement acting as an ideal insulator during the interruption of operation.

We claim:

1. A multiple bed reactor for the catalytic conversion of $SO_2$ containing gases to $SO_3$ including a plurality of contact catalytic beds arranged in series to receive such gas, an inidirect heat exchanger to heat indirectly gas passing to one of said beds and receiving heated gas from one of said beds, said heat exchanger being positioned in a ring surrounding and immediately adjoining the first contact bed of the series and having means to direct such gas to be heated across the heater in co-current and in counter-current flow directions with respect to the heated gas.

2. A reactor as set forth in claim 1, in which said heat exchanger surrounds and adjoins the first two beds of said series.

3. A reactor as set forth in claim 1, in which the gas from the bed to the heat exchanger is provided with a U-shaped path in the heat exchanger.

4. A reactor as set forth in claim 1, in which said means to direct such gas to be heated across the heater is provided to direct such gas in co-current, counter-current and transverse flow directions with respect to the heated gas.

5. A reactor as set forth in claim 2, in which means is provided to introduce cold gas in the gas stream between said first and second beds.

6. A reactor as set forth in claim 5, in which said introducing means comprises a centrally positioned pipe having at its end outwardly diverging radial passages, a distribution mushroom at the end of said pipe, and a wall about the end of said pipe provided with an annular opening for the passage of gas therethrough.

References Cited in the file of this patent

UNITED STATES PATENTS

| | | |
|---|---|---|
| 1,321,358 | Beck | Nov. 11, 1919 |
| 1,618,265 | Bramwell | Feb. 22, 1927 |
| 1,682,787 | Jaeger | Sept. 4, 1928 |
| 1,821,956 | Yee | Sept. 8, 1931 |
| 1,949,122 | Jeffcott | Feb. 27, 1934 |
| 1,960,386 | Lopez | May 29, 1934 |
| 2,399,560 | Murphree | Apr. 30, 1946 |
| 2,438,242 | Watson | Mar. 23, 1948 |
| 2,846,291 | Johannsen et al. | Aug. 5, 1958 |
| 2,995,426 | Keith | Aug. 8, 1961 |